United States Patent [19]
Zhu et al.

[11] Patent Number: 5,850,157
[45] Date of Patent: Dec. 15, 1998

[54] LOW VOLTAGE SWING CIRCUITS FOR LOW POWER CLOCK DISTRIBUTION AND METHODS OF USING THE SAME

[75] Inventors: Qing K. Zhu, Fremont; Michael Zhang, Palo Alto, both of Calif.

[73] Assignee: Intel Corporation, Santa Clara, Calif.

[21] Appl. No.: 746,250

[22] Filed: Nov. 7, 1996

[51] Int. Cl.⁶ ........................................... G06F 1/04
[52] U.S. Cl. ............................ 327/295; 327/589; 327/165
[58] Field of Search ................................. 327/291–299, 327/256–259, 309, 321, 333, 165, 390, 589; 326/62–81

[56] References Cited

U.S. PATENT DOCUMENTS 5,469,116  11/1995  Slemmer .................................... 331/74

OTHER PUBLICATIONS

Bazes, Mel, "Two Novel Fully Complementary Self–Biased CMOS Differential Amplifiers", IEEE Journal of Solid–State Circuits, vol. 26, No. 2, Feb. 1991, pp. 165–168.

Kojima, Hirotsugu, Satoshi Tanaka and Katsuro Sasaki, "Half–Swing Clocking Scheme for 75% Power Saving in Clocking Circuitry", 1994 Symposium on VLSI Circuits Digest of Technical Papers, 1994 IEEE, pp. 23–24.

De Man, Erik, and Matthias Schobinger, "Power Dissipation in the Clock System of Highly Pipelined ULSI CMOS Circuits", IWLPD 1994 Workshop Proceedings, pp. 133–138.

*Primary Examiner*—Kenneth B. Wells
*Attorney, Agent, or Firm*—Jeffrey S. Draeger

[57] ABSTRACT

A clock distribution system for low power operation. Such a clock distribution system includes a global clock generation circuit coupled to generate a global clock signal. This global clock signal is received by a local clock generation circuit which generates a local clock signal. While the system has an operating voltage generally used throughout the system, at least one of the global clock signal and the local clock signal is a small swing clock signal which has a voltage swing substantially less than the operating voltage of the system.

26 Claims, 4 Drawing Sheets

FIG. 4

LOW VOLTAGE SWING CIRCUITS FOR LOW POWER CLOCK DISTRIBUTION AND METHODS OF USING THE SAME

FIELD OF THE INVENTION

The present invention pertains to the field of signal generation and distribution for integrated circuits. More specifically, the present invention pertains to small swing circuits for low power generation and distribution of clocks and other signals.

BACKGROUND

Desirable increases in processing speeds and computational abilities for both computer systems and individual electronic components are typically accompanied by disadvantageous electric power consumption increases. Consequently, power savings techniques are increasingly employed to moderate overall electricity consumption, reduce heat production, and increase battery life in portable products.

At a system level, hardware and software techniques assist in such power savings. Well known techniques allow computer system hardware and software to disable components which have been inactive for a period of time. For example, a power conservation mode such as system management mode may be used to turn off a hard disk drive in a computer after a period of inactivity.

Additionally, well known techniques allow clock signals for the entire system, or a portion thereof, to be throttled back (slowed down) or turned off entirely. For example, a system management mode may be used to effectively monitor system activity and slow control clocks when low activity is detected. Even the clock for the central processor may be throttled back to reduce power consumption and/or heat production.

Unfortunately, these techniques do not provide significant power reduction when the computer system is fully operational. That is, the system does not operate at reduced power levels when intensive processing is occurring and/or all peripheral devices are in use.

Similarly, a number of component level solutions provide only power savings in periods of inactivity. For example, the IntelDX4™ microprocessor includes circuitry which disables clocking for a substantial portion of the microprocessor if all other processing has ceased while waiting for a bus cycle to complete. Microprocessors may also reduce power consumption by disabling clocks to a single functional unit such as a floating point unit while that unit is not in use.

Such component level clock throttling techniques can be used with either of two forms of clock networks traditionally found in integrated circuit design. A first type of clock network includes a global clock driver to drive a clock network which has individual clocked elements such as latches or pre-charge devices at its endpoints. With larger integrated circuits and higher clock frequencies, such a non-buffered network may not operate effectively due to clock skewing caused by heavy clock line loading (i.e. too many clocked elements attached to a line) and/or a relative imbalance in the clock network. As a result, some integrated circuit designs employ a clock distribution network with local buffer or regeneration circuits. This allows a more balanced clock tree and generally reduces total loading of the global clock generation circuit. Either of these traditional clocking arrangements is adaptable to the clock throttling power conservation techniques discussed; however, as previously mentioned, such power reduction techniques only reduce power during periods of inactively.

One technique which does provide power savings at all times during integrated circuit operation is known as Voltage Reduction Technology used by Intel Corporation in some Pentium® Processor family products. Voltage Reduction Technology involves the redesign of input/output (I/O) circuits to include a voltage-level converter to lower the microprocessor core supply voltage and isolate this core supply from the higher system supply voltage.

The resulting power savings can be quite advantageous despite a reduction of the maximum core operating frequency because lowering both voltage and frequency can reduce power consumption more dramatically than performance. As an example, a sixteen percent core supply voltage reduction may cause a seemingly large twenty percent loss in frequency, but also result in an even more substantial forty-five percent power reduction.

The Voltage Reduction Technology does, however, have other penalties and risks. First, voltage level converters in the I/O circuits are required to isolate the core and I/O voltage supplies. This increases the I/O pad size and can impact overall chip size in a pad-limited chip. Second, I/O timings become worse due to the additional delay of the voltage level converters. Finally, some voltage-sensitive circuits may fail due to the lower supply voltage circuits. Especially prone to such failure are circuits such as phase locked loops and sense amps which contain nodes that do not transition through the entire available voltage range even during normal operation.

One additional technique, discussed in "Half-Swing Clocking Scheme for 75% Power Saving in Clocking Circuitry" by Kojima et al. published in the IEEE 1994 Symposium on VLSI Circuits Digest of Technical Papers, pp. 23–24, provides a chip utilizing a clock network having a number of clocks generated with a voltage swing of one-half the supply voltage (Vdd). In a large integrated circuit (IC), however, the burden of routing a single network having numerous low swing clock signals throughout the IC may diminish or negate any overall advantage gained from such a clocking scheme. Furthermore, in order to provide the one-half Vdd voltage swing, the approach of Kojima et al. requires capacitors which are much larger than the clock network capacitance to provide the one-half Vdd voltage level. In a large integrated circuit, fabrication of sufficiently sized capacitors or an alternate independent voltage supply circuit may prove prohibitively expensive in terms of die area consumption.

Similarly, an article "Power Dissipation in the Clock System of Highly Pipelined ULSI CMOS Circuits," Erik De man et al., IWLPD '94 Workshop Proceedings, International Workshop on Low Power Design, Apr. 1994, pp. 133–138, describes a charge sharing local clock buffer system. This article fails to detail the use of charge sharing techniques in a two phase clock environment where successive latches are clocked with alternating non-overlapping clocks or sets of clocks. Furthermore, this article only advocates local reduced voltage clocking rather than local and global techniques.

Thus, prior art power reduction techniques exhibit several weaknesses. Prior art clock throttling techniques do not reduce power during steady state and/or intensive operation but rather only reduce power where inactivity is detected. Other techniques risk causing malfunction of sensitive circuits, consume significant integrated circuit die area, fail to support existing clocking schemes, or lack combined global and local optimizations. Accordingly, the prior art does not adequately address the need for reliable power reduction during normal chip operation.

SUMMARY

The present disclosure describes a clock distribution system for low power operation. Such a clock distribution system includes a global clock generation circuit coupled to generate a global clock signal. This global clock signal is received by a local clock generation circuit which generates a local clock signal. While the system has an operating voltage generally used throughout to the system, at least one of the global clock signal and the local clock signal is a small swing clock signal which has a voltage swing substantially less than the operating voltage of the system.

BRIEF DESCRIPTION OF THE FIGURES

The present invention is illustrated by way of example and not limitation in the figures of the accompanying drawings.

DETAILED DESCRIPTION

The present invention provides methods and apparatus for low power clock distribution. In the following description, numerous specific details such as particular clock networks, circuit implementations, and transistor arrangements are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

Figure 1:
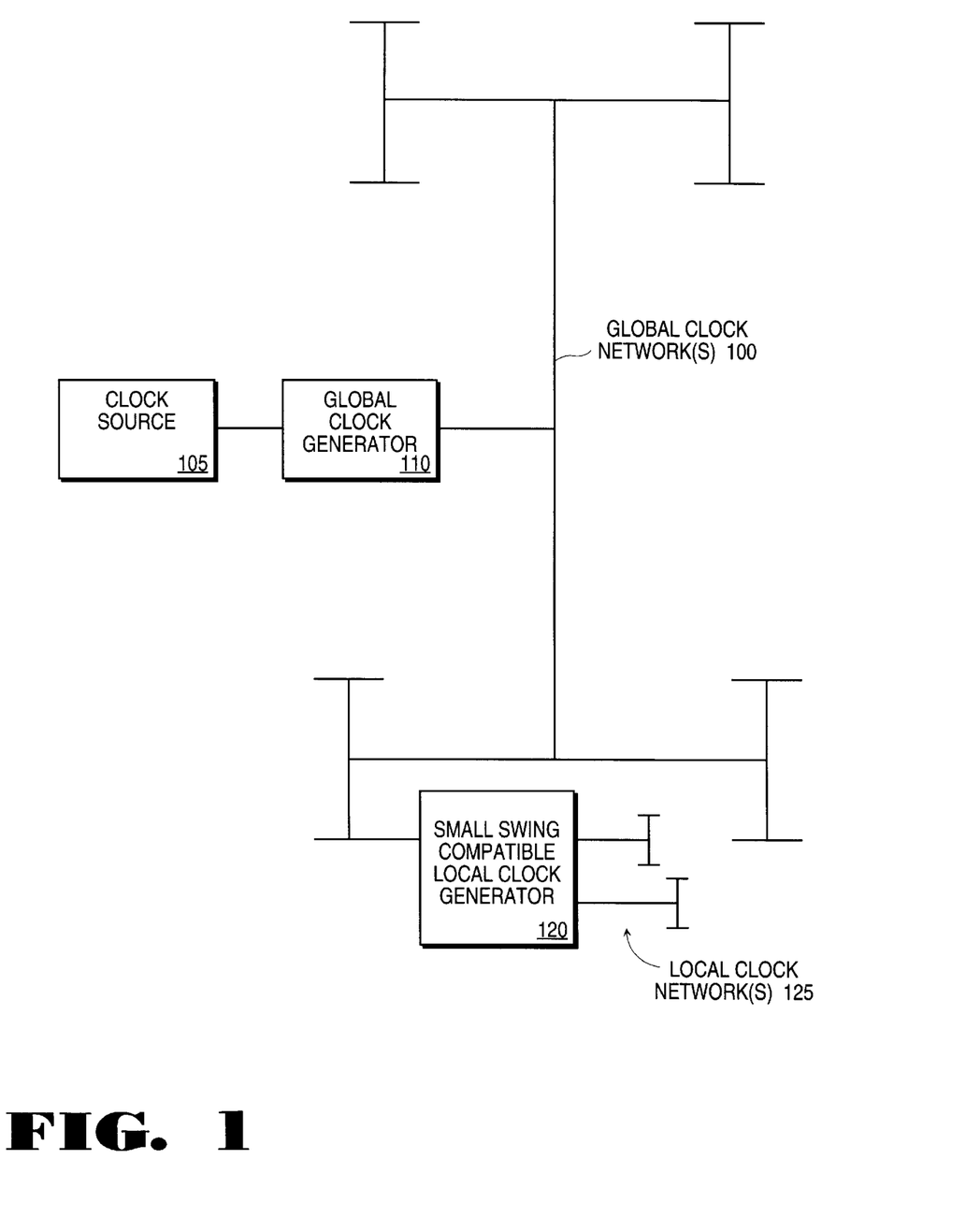
FIG. 1 illustrates one embodiment of a clock distribution system of the present invention.

One system using low power clock distribution of the present invention is illustrated in FIG. 1. In this system, a global clock generator 110 receives an input clock from a clock source 105 and generates at least one global clock signal. The global clock signal(s) are driven on one or more global clock networks 100. A small swing compatible local clock generator 120 coupled to an endpoint of the global clock network 100 drives at least one local clock on an appropriate number of local clock networks 125. Power consumption is reduced since at least one of these clock signals operates with a voltage swing substantially less than an operating voltage for the system.

In one embodiment, discussed below in reference to FIG. 2 and FIG. 3, the small swing compatible local clock generator 120 receives a full swing global clock over the global clock network 100 and generates a plurality of reduced swing local clocks on the local clock networks 125. In this embodiment, latches and other clock control circuits coupled to these networks are designed to properly operate with the reduced swing clock signals.

In another embodiment, discussed below in reference to FIG. 4, the global clock generator 110 produces a very low swing global clock signal which is then used by the small swing compatible local clock generator 120 to generate full swing local clock signals. These techniques may be used in combination for even further power reductions.

Figure 2:
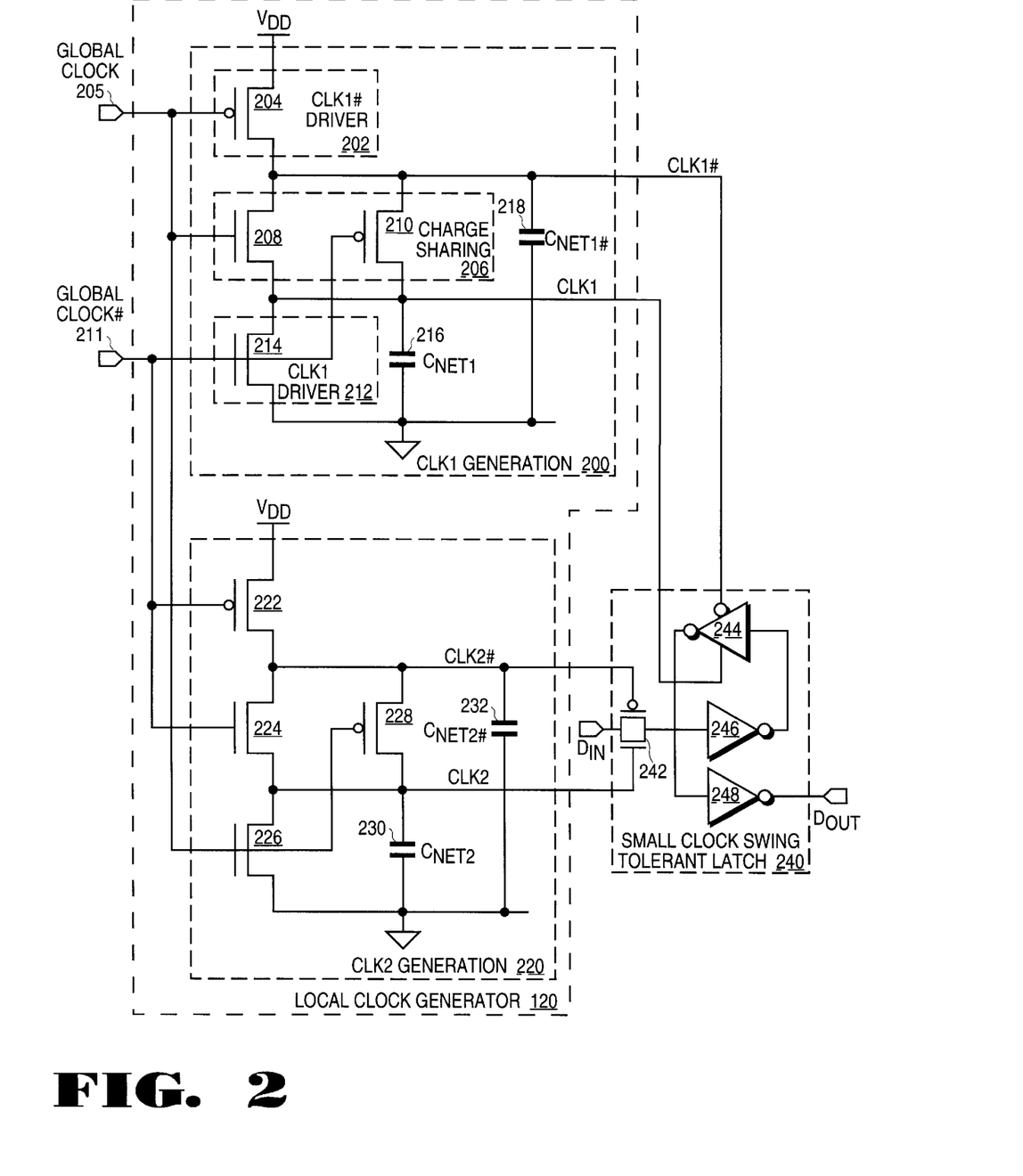
FIG. 2 illustrates one embodiment of a power saving clocking arrangement including the local clock generator of FIG. 1.

Returning to the embodiment of FIG. 2, the local clock generator 120 includes a first clock generation circuit 200 and a second clock generation circuit 220. These clock generation circuits produce CLK1, CLK1#, CLK2, and CLK2# signals which are routed over the local clock networks to circuits such as a small clock swing tolerant latch 240. The latch 240 is designed to operate with clocks having a voltage swing of approximately one-half Vdd, the operating voltage.

The first clock generation circuit 200 is coupled to receive a global clock signal 205 and a global clock# signal 211 as inputs. A first clock driver 202 controlled by the global clock signal 205 selectably couples a CLK1# line to a source voltage supply line (Vdd). A second clock driver 212 controlled by the global clock# signal 211 selectably couples a CLK1 line to a ground voltage supply. A charge sharing mechanism 206 couples the CLK1 line to the CLK1# line.

In this embodiment, the first clock driver 202 is a P channel transistor 204, the second clock driver 212 is an N channel transistor 214, and the charge sharing mechanism 206 comprises a P channel transistor 210 in parallel with an N channel transistor 208. The N channel transistor 208 is controlled by the global clock signal 205, and the P channel transistor 210 is controlled by the global clock# signal 211. Alternate embodiments of the charge sharing mechanism 206 selectively couple the CLK1 and CLK1# lines using a single transistor or other mechanism controlled by only one of the global clock signals. A capacitance 218 (CNET1#) is illustrated to represent the capacitance of the clock network for the CLK1# line. Similarly, a capacitance 216 (CNET1) represents the capacitance of the clock network for the CLK1 line.

When the global clock and global clock# signals are active, the clock drivers 202 and 212 drive the CLK1 and CLK1# lines respectively to ground and Vdd. When the global clock and the global clock# signals become inactive, the charge sharing mechanism 206 connects the CLK1 and CLK1# networks, thereby sharing charge stored by the capacitances of each network. As a result, an intermediate voltage level (between Vdd and ground) remains on both CLK1 and CLK1#. Preferably, balanced (nearly equal capacitance) clock networks are used so that an intermediate voltage of approximately Vdd/2 results. The charge sharing arrangement allows the production of the intermediate voltage without requiring an additional power source such as an additional voltage supply or an additional capacitive network to generate Vdd/2.

Similarly, the second clock generation circuit generates CLK2 and CLK2# signals. A P channel transistor 222 controlled by the global clock# signal selectably couples a CLK2# line to the Vdd voltage supply line. An N channel transistor 226 controlled by the global clock signal selectably couples a CLK2 line to the ground voltage supply line. An N channel transistor 224 controlled by the global clock# signal and a P channel transistor 228 controlled by the global clock signal and connected in parallel to the N channel transistor 224 form a second charge sharing mechanism which selectably couples the CLK2 and CLK2# lines together. Enabling the second charge sharing mechanism results in charge sharing between network capacitances 230 and 232 which respectively represent the capacitance of the CLK2 and CLK2# networks. Again, balanced clock networks provide a voltage of approximately Vdd/2 on both the CLK2 and CLK2# lines.

Figure 3:
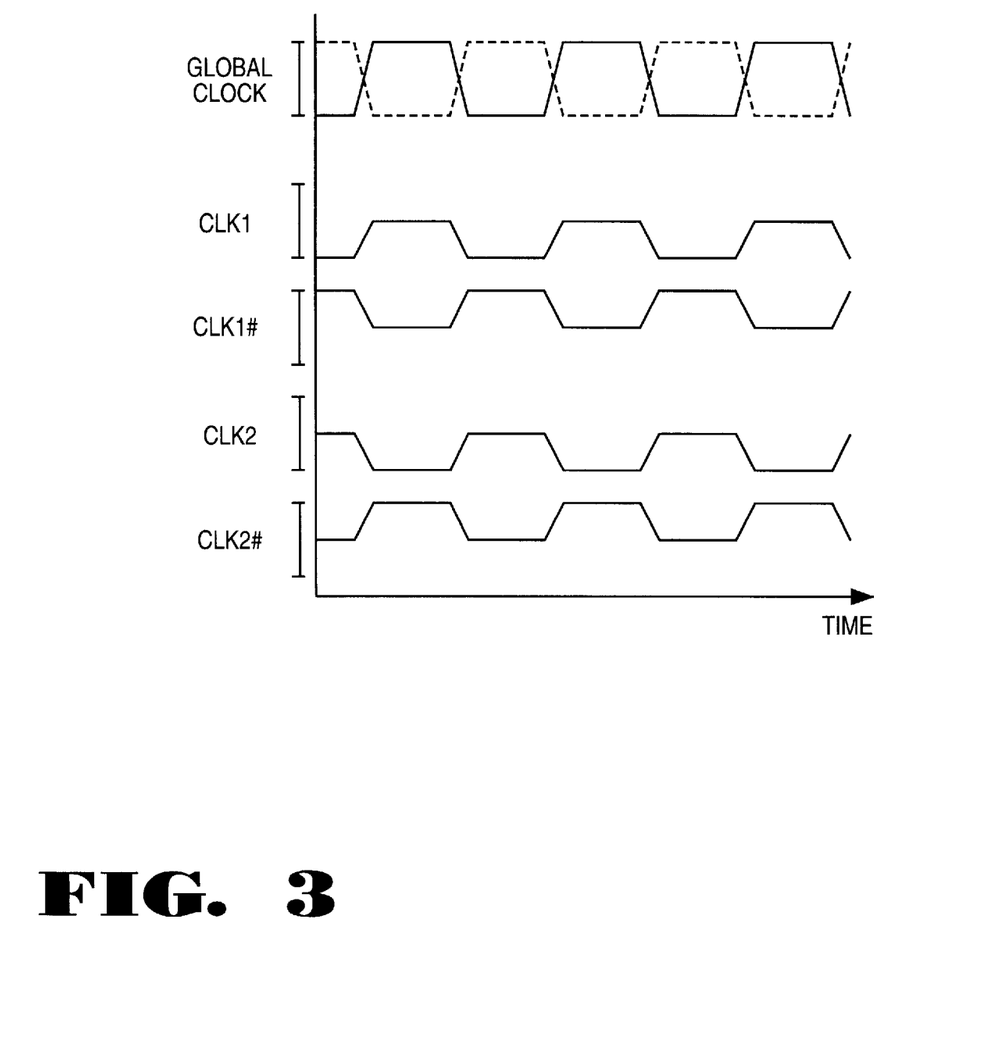
FIG. 3 is a timing diagram illustrating clock signals generated by the embodiment of FIG. 2.

FIG. 3 illustrates the relationship between the global clock signals, the CLK1 signals, and the CLK2 signals. The CLK1 and CLK2, signals, as well as the CLK1# and the CLK2# signals, are opposed in phase. That is, CLK1 is 180 degrees out of phase with respect to CLK2, and CLK1# is 180 degrees out of phase with respect to CLK2#. Additionally, CLK1# is an inverted version of CLK1. While CLK1# is the logical inverse of CLK1, it does not have the exact opposite voltage levels, but rather transitions between Vdd and approximately Vdd/2 whereas CLK1 transitions between ground and Vdd/2.

CLK1 and CLK1# have the same Vdd/2 voltage level at the half clock cycle; however, these clocks are not sufficient to provide two phase clocking for two phase latches and flip-flops. The additional use of CLK2 and CLK2# to realize two phase clocking extends power saving advantages to two phase clock designs. As a result, the described power saving clocking techniques can improve designs without sacrificing existing two phase clocking methodologies and design practices.

The small clock swing tolerant latch 240 is especially adapted for use with these reduced swing clock signals. The latch includes an input stage which receives data (DIN) via a pass gate 242. The pass gate 242 has an active low enable input coupled to receive the CLK2# signal and an active high enable input coupled to receive the CLK2 signal. When CLK2 and CLK2# are active, an inverter 246 drives a received value from the pass gate 242 to a feedback stage comprising a tri-state driver 244. The tri-state driver 244 has an active low enable input coupled to receive the CLK1# signal and an active high enable input coupled to receive the CLK1 signal. When the CLK2 and CLK2# signals are active, the latch 240 sustains data. The data is driven to the latch data output (DOUT) via an inverter 248.

This power saving clocking arrangement thus reduces power consumption by utilizing a local clock network having local clocks which have a voltage swing substantially than less than (i.e. in this case, one-half) the system operating voltage. Additionally, a two phase clocking scheme is supported by utilizing the four clock lines CLK1, CLK1#, CLK2, and CLK2#. Moreover, the low voltage swing is generated without using an additional power supply. While decreased gate-to-source voltages on latch transistors may result in slowed latch throughput, the power savings can justify the speed loss. In fact, since power consumption is proportional to the square of the applied voltage, the reduction of the clock swing by fifty percent theoretically could lead to power savings of up to seventy-five percent, a value diminished in reality by the power consumption of the additional local clock generation circuitry.

Figure 4:
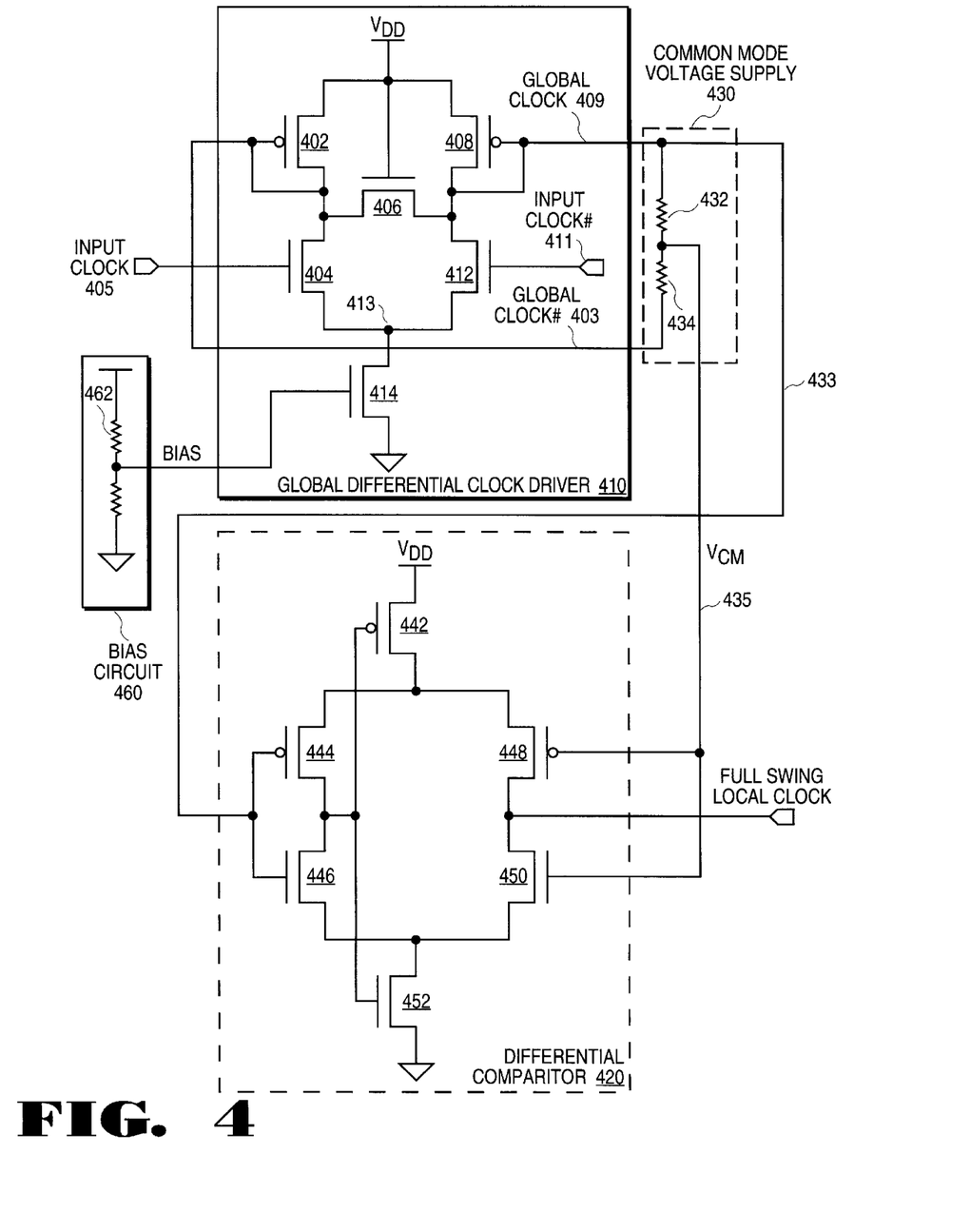
FIG. 4 illustrates details of another embodiment of the clock distribution system of FIG. 1.

An alternate embodiment which reduces power consumption by utilizing a global clock signal having a substantially reduced voltage swing is illustrated in FIG. 4. This embodiment includes a global differential clock driver 410 which drives the reduced voltage swing global clock over a global clock network 433. A self biasing differential comparitor 420 receives the global clock signal and converts this signal to at least one full swing local clock signal which can be used by traditional logic circuits.

Since specialized differential circuits are used to send and receive the small swing global clock, the percentage voltage reduction possible is only limited by noise rejection capabilities of the generating and receiving circuits. Depending on the noise margin allowed, a voltage reduction of two-thirds or more may be achieved, thus saving significant amounts of power in the distribution of the global clock signal.

Generally, the use of differential signals requires the transmission of a signal and its complement. In the area of clock distribution, the layout area overhead of two balanced clock trees may be quite substantial. The embodiment of FIG. 4 overcomes this problem by routing a common mode voltage signal (VCM) from a common mode voltage supply 430 to the differential comparitors. Since the common mode voltage signal is a substantially DC signal, the routing of this signal need not be as strictly controlled as is necessary for a typical clock signal. Accordingly, a balanced clock tree is not necessary for the common mode signal, and the overhead of using a differential signal is reduced to a level where it is offset by the advantage of the resulting power savings.

The global differential clock driver 410 shown is one example of a differential driver circuit. Such differential drivers are known in the art, and other circuits capable of generating a reduced voltage replica of an input clock signal may be used. In this example, a P channel transistor 402 and an N channel transistor 404 are connected in series between the voltage supply (Vdd) and a bias node 413. The gate of the P channel transistor 402 is coupled to its drain, and the gate of the N channel transistor 404 is coupled to receive an input clock signal 405.

A P channel transistor 408 and an N channel transistor 412 are also connected in series between Vdd and the bias node 413. The gate of the P channel transistor 408 is also connected to its source, and the gate of the N channel transistor 412 is coupled to receive an input clock# signal 411. A bias transistor 414 couples the bias node 413 to the ground voltage supply line. A small shunt transistor 406 couples the sources of the N transistors 404 and 412 to limit the swing of the output voltage of the clock driver 410.

A bias voltage provided on the gate of the bias transistor 414 controls the magnitude of the voltage swing of the global clock signal. A bias circuit 460 provides the bias voltage level for the bias transistor 414. In this embodiment, a voltage divider circuit 462 is shown for the bias circuit 460; however, other temperature or process compensated bias circuits known in the art may be used to apply a desired bias to the bias transistor 414.

The global clock signal generated at the drain of the P channel transistor 408 is transferred by a global clock line 409 to the common mode voltage supply 420 and the global clock network 433. The global clock# signal generated at the drain of the P channel transistor 402 is transferred to the common mode voltage supply 430 by a global clock# line 403.

The common mode voltage supply generates a single common mode voltage (VCM) which can be used by a number of differential comparitors such as differential comparitor 420 (e.g. one for each local clock tree supported by the global clock network 433). A resistive divider comprising resistor 432 and resistor 434 connected in series between the global clock signal line 409 and the global clock# signal line 403 provides the essentially DC common mode voltage signal on the common mode voltage line 435. As previously mentioned, the DC nature of this signal obviates the need for balanced or other specialized routing as would be required for an additional clock signal. Alternately, the common mode voltage supply may simply be formed locally for each differential comparitor using a resistive divider dividing down the system voltage source (Vdd).

The differential comparitor 420 shown is also only exemplary of a variety of traditional comparitors which may be used to recover the full swing clock signal from the small swing global clock signal. This circuit is a self-biasing differential comparator also described in the article "Two Novel Fully Complementary Self-Biased CMOS Differential Amplifiers" by Mel Bazes published in the IEEE Journal of Solid-State Circuits, Vol. 26, No. 2, February 1991. Any comparitor circuit which can discern the global clock using a common mode voltage supply is appropriate.

In the illustrated circuit, the global clock signal drives the gates of an N channel transistor 446 and a P channel transistor 444 which are connected in series. The gates of a series P channel transistor 448 and N channel transistor 450 are coupled to the common mode voltage line 435. These transistors are connected in parallel with the transistors 448 and 450. The parallel combination of series transistors 444 and 446, and series transistors 448, and 450 is connected to Vdd by a P channel biasing transistor 442 and connected to ground by an N channel biasing transistor 452. The arrangement is considered self biasing because the gates of the biasing transistors 442 and 452 are biased by the transistors 444 and 446.

From the small signal global clock signal transmitted over the global clock network 433, the differential comparator 420 generates a full swing local clock signal at the drain of N transistor 450. This full swing local clock signal then may be used to clock standard local circuitries, or may be used to generate small swing local clocks such as those discussed with respect to FIGS. 2 and 3.

Alternately, one embodiment utilizes the technique of local regeneration with the easily routed common mode voltage to provide low power signaling over a bus between integrated circuits. In this alternate embodiment, the signal line 433 shown in FIG. 4 carries a device output signal and is routed from a first device containing the driver circuit 410 (in this embodiment a bus driver) to the differential comparitor 420 which forms a part of an input buffer. In this embodiment, the differential comparator then reproduces the full swing local signal, conveying a small swing version of the output signal across the bus in a power saving manner.

Thus, the method and apparatus of the present invention provide low power signal distribution in a variety of contexts. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A clock distribution system having an operating voltage for providing clocks to a circuit operating at the operating voltage, comprising:
   a global clock generation circuit coupled to generate a global clock signal which has a voltage swing substantially less than said operating voltage; and
   a local clock generation circuit coupled to receive said global clock signal, said local clock generation circuit having a comparator for comparing a common mode voltage supply and said global clock signal, the local clock generation circuit being coupled to generate a local clock.

2. The clock distribution system of claim 1 wherein said local clock is a small swing clock.

3. The clock distribution system of claim 2 wherein said local clock generation circuit generates a plurality of small swing local clock signals having said voltage swing substantially less than said operating voltage, said local clock being one of said plurality of small swing local clock signals, said voltage swing being approximately one-half said operating voltage.

4. The clock distribution system of claim 3 wherein said plurality of small swing local clock signals includes a first small swing local clock signal, an inverted first small swing local clock signal, a second small swing local clock signal, and an inverted second small swing local clock signal, said first small swing local clock signal and said second small swing local clock signal being opposed in phase, and said inverted first small swing local clock signal and said inverted second small swing local clock signal being opposed in phase.

5. The clock distribution system of claim 1 wherein said common mode voltage supply comprises a common mode voltage generation circuit coupled to the small swing clock signal and coupled to an inverted small swing clock signal generated by said global clock generation circuit.

6. The clock distribution system of claim 1 wherein said global clock signal and said local clock have respectively a first voltage swing and a second voltage swing, both said first voltage swing and said second voltage swing being substantially less than said operating voltage, said second voltage swing being approximately one-half of said operating voltage.

7. A clock generation system operating at a source voltage established relative to a ground voltage, the clock generation system comprising:
   a CLK1 clock signal line having an associated first capacitance;
   a CLK1# clock signal line having an associated second capacitance;
   a CLK2 clock signal line having an associated third capacitance;
   a CLK2# clock signal line having an associated fourth capacitance;
   a first clock generation circuit having a charge sharing mechanism selectably coupling said CLK1 clock signal line to said CLK1# clock signal line to produce an intermediate voltage, said intermediate voltage being between the operating voltage and the ground voltage and determined by said first capacitance and said second capacitance; and
   a second clock generation circuit having a second charge sharing mechanism selectably coupling said CLK2 clock signal line to said CLK2# clock signal line to produce a second intermediate voltage, said second intermediate voltage being between the operating voltage and the ground voltage and determined by said third capacitance and said fourth capacitance.

8. The clock generation system of claim 7 wherein said CLK1 clock signal line and said CLK1# clock signal line form a balanced clock signal line wherein said first capacitance approximately equals said second capacitance.

9. The clock generation system of claim 7 wherein said first clock generation circuit generates a CLK1 signal and a CLK1# signal from an input clock signal, said CLK1# signal transitioning between said source voltage and said intermediate voltage, said CLK1 signal transitioning between said ground voltage and said intermediate voltage.

10. The clock generation system of claim 9 wherein said charge sharing mechanism includes at least one transistor controlled by at least one of said input clock signal and an inverted version of said input clock signal, said at least one transistor directly coupling said CLK1 clock signal line to said CLK1# clock signal line.

11. The clock generation system of claim 7 wherein said first clock generation circuit comprises:

a first driving mechanism selectably coupling said CLK1# clock signal line to a source voltage supply line; and a second driving mechanism selectably coupling said CLK1 clock signal line to a ground voltage supply line.

12. The clock generation system of claim 11 wherein:

said first driving mechanism comprises a first P channel transistor coupling said CLK1# clock signal line to said source voltage supply line and controlled by an inverted input clock signal;

said second driving mechanism comprises a first N channel transistor coupling said CLK1 clock signal line to said ground voltage supply line and controlled by an input clock signal; and said charge sharing mechanism comprises a second P channel transistor and a second N channel transistor coupling said CLK1 clock signal line to said CLK1# clock signal line, said second P channel transistor being controlled by said input clock signal, said second N channel transistor being controlled by said inverted input clock signal.

13. The clock generation system of claim 9 wherein said second clock generation circuit generates a CLK2 signal and a CLK2# signal from the input clock signal, said CLK2# signal transitioning between said source voltage and said second intermediate voltage, said CLK2 signal transitioning between said ground voltage and said second intermediate voltage.

14. The clock generation system of claim 13 wherein the CLK1 signal and the CLK2 signal are opposed in phase and the CLK1# signal and the CLK2# signal are opposed in phase.

15. A method of distributing clock signals, comprising the steps of:

receiving an input clock signal;

generating a plurality of clock signals having a voltage swing substantially less than an operating voltage by utilizing charge sharing on pairs of complementary clock lines during a first phase; and driving the plurality of clock signals to a plurality of two phase small swing compatible elements.

16. The method of claim 15 wherein the step of generating further comprises the steps of:

charging a CLK1# signal line to the operating voltage during the first phase;

driving a CLK1 signal line to a ground voltage during the first phase; and sharing charge between the CLK1 signal line and the CLK1# signal line during a second phase to generate an intermediate voltage, the intermediate voltage being intermediate between the operating voltage and the ground voltage.

17. The method of claim 16 further comprising the steps of:

charging a CLK2# signal line to the operating voltage during the first phase;

driving a CLK2 signal line to the ground voltage during the first phase; and sharing charge between the CLK2 signal line and the CLK2# signal line during the second phase.

18. The method of claim 17 wherein the step of driving further comprises the steps of:

providing a CLK1 signal on the CLK1 signal line and a CLK1# signal on the CLK1# signal line to an input stage of a latch element; and providing a CLK2 signal on the CLK2 signal line and a CLK2# signal on the CLK2# signal line to a feedback stage of the latch element.

19. A signal distribution system, comprising:

a generation circuit coupled to receive an input signal and to generate an output signal having a voltage swing substantially less than an operating voltage;

a local regeneration circuit comparator having a first input coupled to said global clock signal and a second input coupled to a common mode voltage supply, the local regeneration circuit being coupled to receive said output signal, the local regeneration circuit having a full swing local output signal.

20. The signal distribution system of claim 19 wherein the generation circuit is a global clock generation circuit, the input signal is an input clock, the output signal is a global clock signal, and the signal distribution system is a clock distribution system.

21. The signal distribution system of claim 19 wherein the generation circuit is a bus driver circuit, the output signal is a device output signal, and the local regeneration circuit is a part of an input buffer circuit coupled to receive said device output signal.

22. The clock distribution system of claim 19 wherein the common mode voltage supply comprises a resistive divider.

23. The clock distribution system of claim 22 wherein said resistive divider comprises:

a first resistor coupling a global clock line to a common mode voltage supply output node; and a second resistor coupling an inverted global clock line to the common mode voltage supply output node.

24. A method of distributing a clock signal, comprising the steps of:

receiving an input clock signal having a first voltage swing;

generating a global clock signal having a voltage swing substantially less than said first voltage swing; and generating a local clock signal having the first voltage swing using a comparator having a first input coupled to receive the global clock signal and a second input biased using a common mode voltage.

25. The method of claim 24 further comprising the step of:

coupling a voltage divider node to a second comparator input.

26. A clock generation system operating at a source voltage established relative to a ground voltage, the clock generation system comprising:

a first clock signal line having an associated first capacitance;

a second clock signal line having an associated second capacitance;

a clock generation circuit having a charge sharing mechanism coupling said first clock signal line to said second clock signal line to produce an intermediate voltage during a first clock phase, said intermediate voltage being between the operating voltage and the ground voltage and determined by said first capacitance and said second capacitance, the clock generation circuit driving the first clock signal line to the source voltage during a second clock phase and driving second clock signal line to the ground voltage during the second clock phase.

* * * * *

UNITED STATES PATENT AND TRADEMARK OFFICE
CERTIFICATE OF CORRECTION

PATENT NO. : 5,850,157
DATED : December 15, 1998
INVENTOR(S) : Zhu et al.

Page 1 of 1

It is certified that error appears in the above-identified patent and that said Letters Patent is hereby corrected as shown below:

Column 5,
Line 59, delete "comparitor" and insert -- comparator --.

Column 6,
Lines 10, 53 and 67, delete "comparitors" and insert -- comparators --.
Line 10, insert -- For example, one combination may have a small swing global clock signal with a voltage swing which is substantially less than the operating voltage which is then used to generate a small swing local clock signal (e.g., one with a voltage swing of approximately one-half of the operating voltage.) --.
Lines 53-54, 64 and 65, delete "comparitor" and insert -- comparator --.

Column 7,
Lines 3, 7, 23, 35 and 37, delete "comparitor" and insert -- comparator --.

Signed and Sealed this

Fourteenth Day of September, 2004

JON W. DUDAS
*Director of the United States Patent and Trademark Office*